May 31, 1960  V. M. LEONARD  2,938,421
INDICATOR AND TEACHING DEVICE FOR KEYBOARD INSTRUMENTS
Filed Oct. 28, 1957  2 Sheets-Sheet 1
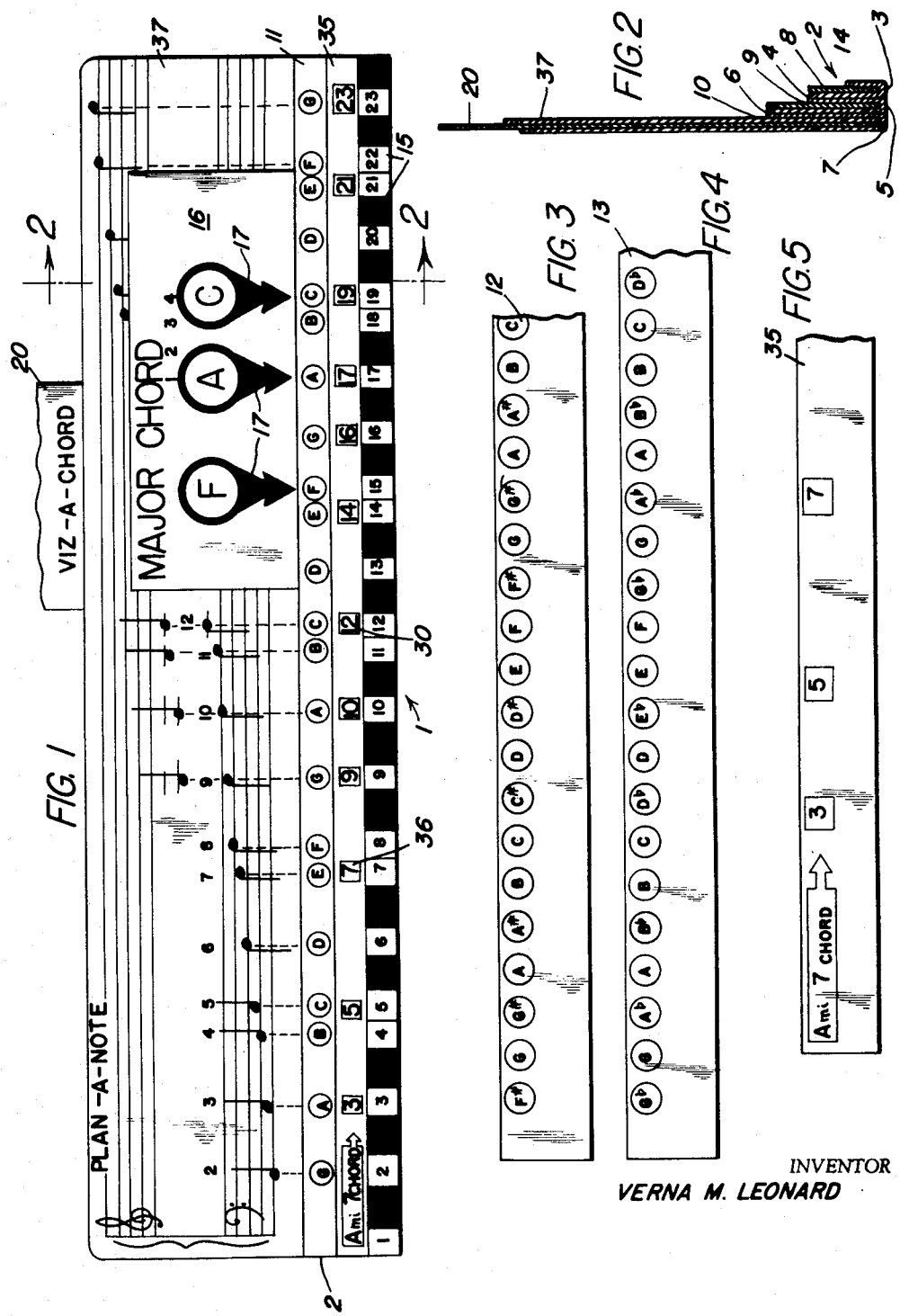
INVENTOR
VERNA M. LEONARD May 31, 1960 V. M. LEONARD 2,938,421
INDICATOR AND TEACHING DEVICE FOR KEYBOARD INSTRUMENTS
Filed Oct. 28, 1957 2 Sheets-Sheet 2
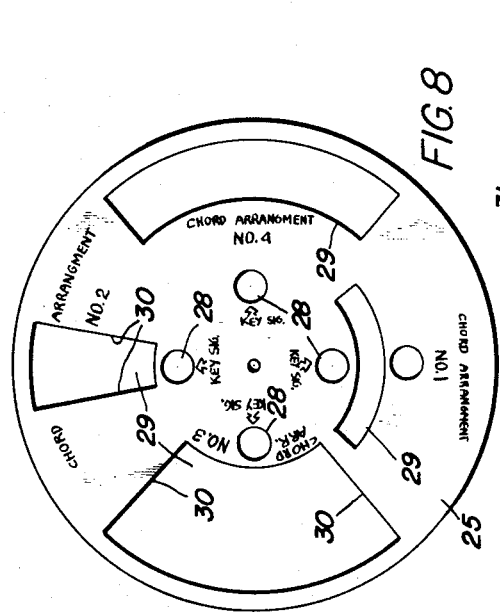
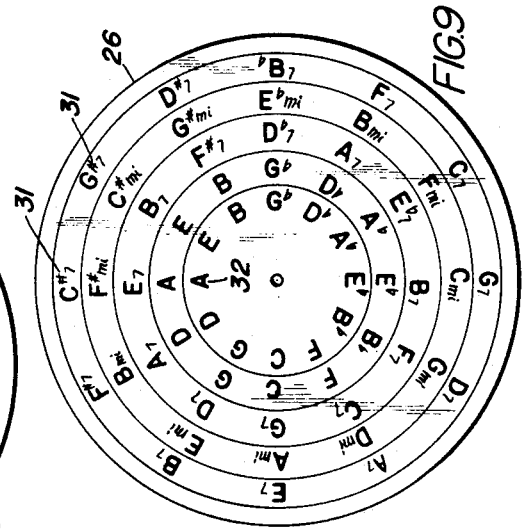
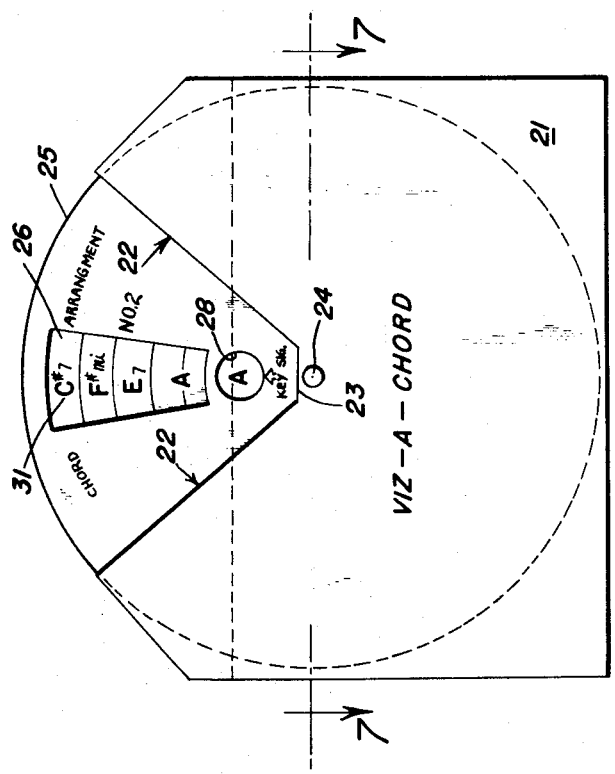
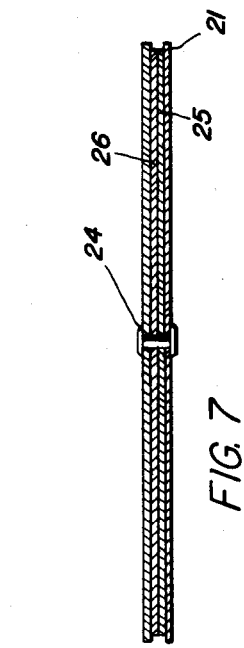
INVENTOR
VERNA M. LEONARD United States Patent Office 2,938,421
Patented May 31, 1960

2,938,421

INDICATOR AND TEACHING DEVICE FOR KEYBOARD INSTRUMENTS

Verna M. Leonard, 6353 N. Blackstone, Fresno, Calif.

Filed Oct. 28, 1957, Ser. No. 692,686

1 Claim. (Cl. 84—480)

The present invention relates generally to devices for assisting musically relatively untrained persons as well as musicians to play the piano, organ, or other keyboard instrument.

Many people are desirous of playing the piano, and particularly popular music, who do not desire or are unwilling to devote themselves to a classical course of training in music and classical piano playing techniques. It has been found feasible to train such persons, in a relatively short time, to play the piano in a pleasing manner. To accomplish this objective certain mechanical aids have been found invaluable. Further, even trained musicians are frequently deficient in knowledge concerning harmonies and improvising chords. These may be aided and their musical training enhanced by my invention.

It is a primary purpose of the present invention to provide mechanical aids to persons desirous of learning to play keyboard instruments, or of improving their musical ability, which will enable such persons rapidly to learn to play music, including harmonies and chords, and to develop and improvise for themselves chords and harmonies appropriate to a wide selection of musical pieces.

It is a further object of the present invention to provide a system for generating multiple harmonious musical chords appropriate to notes of a melody.

It is a broad object of the present invention to provide mechanical devices for facilitating the playing of musical compositions on the piano with harmonious chords, by relatively untrained persons.

The above and still further objects, features and advantages of the present invention will become apparent upon consideration of the following detailed description of one specific embodiment thereof, especially when taken in conjunction with the accompanying drawings, wherein:

Figure 1 is an assembly drawing in front elevation of a complete plan-a-note system according to the present invention;

Figure 2 is a sectional view taken on the line 2—2 of Figure 1;

Figure 3 is a view in front elevation of a slide for indicating note values in a sharp key;

Figure 4 is a view in front elevation of a slide for indicating note values in a flat key;

Figure 5 is a view in front elevation of a slide for incorporating a guide for playing a chord, in the plan-a-note system;

Figure 6 is a view in front elevation of a viz-a-chord device, incorporated in the plan-a-note system;

Figure 7 is a view in section taken on the line 7—7 of Figure 6; and

Figures 8 and 9 are views of rotatable discs incorporated in the viz-a-chord device of Figure 6.

Referring now more particularly to the accompanying drawings, the reference numeral 1 denotes a device, called by me a "plan-a-key." The "plan-a-key" includes a "key board holder," consisting of a holder 2 for various elements of my novel device. The holder 2 consists of a sheet of flexible material, such as cardboard or heavy paper in which have been formed a number of longitudinal folds 3, 4, 5, 6, 7 forming a plurality of vertically superposed pockets or receptacles 8, 9, 10; which extend longitudinally and are closed below and open above.

I provide slides of paper or the like 11, 12, which may be selectively inserted into the center fold 9. The slide 11 is shown inserted and is used when the music to be played is written in the key of C. The slide 12 is used when the music to be played is written in a key signature having sharps, the slide 13 is used when the music to be played is written in a key signature having flats.

The outer face 14 of the pocket or receptacle 8 is marked with black and white rectangles 15, spaced and dimensioned to conform with the black and white keys of the keyboard of a piano, when the holder 2 is placed in an upright position behind the keys. The selected one of the slides 11, 12, 13 then is positioned in the middle pocket to name the keys of the piano keyboard, for the type of key signature employed in the music to be played, i.e., flat, sharp or natural.

In the uppermost fold 10 may be placed a chord card 16, which may be slid to any position along the length of the card. The chord cards 16 each contains a different permissible chord, and each indicates by arrows 17, the locations of the keys which comprise the cord. The large members 18 above the arrows indicate the separations of the notes of the chord, from the other, in terms of keys of the keyboard. For example, the chord card 16, illustrated in the accompanying drawings, indicates a chord made up of three notes. The separation between the first and second note of the chord is five keys (counting black and white keys each as one), and the separation between the second and third note is four keys.

The location of the first or left-hand arrow 17 is determined by the chord symbol provided at frequency intervals over the melody line of modern popular sheet music. By suitable selection of chord cards 16 any type of chord may be selected, as major, minor, augmented, diminished, etc. By placing the left-hand, or first, arrow 17 of the chord card 16 over that position of the slide in the middle fold which corresponds with the chord symbol as provided in the sheet music, the arrows 17 of the chord card will point to the notes of the desired chord. These may then be written on the music for future reference. In this way sheet music may be marked by the player with a series of chords, to be played by the left-hand, the numbers on the selected chord card 16 being translated into notes, to be played by reference to the note values indicated in the slide in the center fold.

While chords may be formed by reference to chord cards 16 as above explained, resort may also be had to a visible chord selector 20, called by me a viz-a-chord, which is capable of indicating a selection of chords of graded difficulty, for use with any given key signature. More specifically, a cover card 21 is provided having a V-shaped opening 22 of about 90°. At the apex 23 of the V is provided a rivet 24 or other suitable pivot, on which rotate two discs 25, 26 so that an angular sector of each disc falls within the V-shaped opening 22. The uppermost disc 25 includes four equally spaced circular apertures 28, lying on a small circle centered on the pivot, and a generally trapezoidal window 29 radially centered on each small circle, the windows 29 having radial sides 30 and arcuate tops and bases. The lowermost disc 26 has imprinted thereon a plurality of chord combinations 31, concentric with the pivot, and each at a different radius. The innermost two annuli contain also key signatures 32 any of which may be brought into register with any of the circular apertures 28. When so brought into register there is visible through the window radially centered on the selected circular aperture a series of available chords, in letter notation, each visible on a different radius of the lowermost disc.

Four circular apertures and four windows are provided, for the purposes of making available four sets of chords for each key signature, and the several sets of chords may be of graded difficulty.

In the first or lowermost pocket or slide may be inserted a strip 35, referring to a given chord type, and showing combinations of notes available for forming chords of this type. The chord type illustrated is, for the sake of example only, on A minor seventh chord. The numbers 36 on the strip are located just under note designators in the middle slot, so that the notes corresponding to a chord may be readily read off.

We may then consider the illustration of Figure 1 to include several systems of chord improvisation. For example, the strip 35 may remain unused, or the chord card may remain unused, or each may be employed for suggesting chords for different parts of the same musical number.

In the pocket 10 may be placed the viz-a-chord 21, behind a strip 37 which carries in musical notation, for both base and treble clefs, the equivalents of the letter notes indicated in the pocket 9.

I have, accordingly, provided a unitary device which supplies the player with identifications of each piano key in letter and musical notation. In addition several facilities are provided for indicating preferred and alternate chords to be played with any chord designation or melody line in sheet music.

While I have described and illustrated one specific embodiment of my invention, it will be clear that variations of the details of construction which are specifically illustrated and described may be resorted to without departing from the true spirit and scope of the invention as defined in the appended claim.

What I claim is:

A device for assisting in the playing of a keyboard instrument, comprising a substantially rectangular upright sheet of flexible material having a plurality of unitary longitudinally extending folds formed therein extending the full width of the sheet to provide a plurality of spaced apart parallel open top pockets therebetween, said pockets having the bottoms thereof lying in the same horizontal plane aligned with the bottom of said sheet, and their tops progressively decreasing in height away from the sheet, said rectangular sheet adjacent one of said pockets having imprinted thereon a series of black and white rectangles spaced and dimensioned to correspond spatially with the black and white keys of a keyboard instrument, a first strip mounted in one of said pockets and having imprinted thereon note positions of a musical chord, a second strip mounted in the second of said pockets and having imprinted thereon the letter values of the notes indicated by the series of black and white rectangles for music of a given signature, and a third strip mounted in the third of said pockets having imprinted thereon musical notations corresponding with the letter values of said notes, whereby each of said black and white rectangles is associated with both a letter value of a note and that note written in musical notation.

References Cited in the file of this patent

UNITED STATES PATENTS

| | | |
|---|---|---|
| 183,335 | Sitterley | Oct. 17, 1876 |
| 996,935 | MacMaster | July 4, 1911 |
| 1,323,779 | McDade | Dec. 2, 1919 |
| 1,327,775 | Platt | Jan. 13, 1920 |
| 1,780,918 | Holzman | Nov. 11, 1930 |
| 1,790,287 | Stevens et al. | Jan. 27, 1931 |
| 1,814,251 | King | July 14, 1931 |
| 1,839,558 | Hutchinson | Jan. 5, 1932 |

FOREIGN PATENTS

| | | |
|---|---|---|
| 594,523 | Germany | July 11, 1931 |